United States Patent
Nakano

(10) Patent No.: US 11,098,213 B2
(45) Date of Patent: Aug. 24, 2021

(54) RADIATION-CURABLE INK JET INK SET AND INK JET PRINTING METHOD

(71) Applicant: Seiko Epson Corporation, Tokyo (JP)

(72) Inventor: Keitaro Nakano, Matsumoto (JP)

(73) Assignee: Seiko Epson Corporation

(*) Notice: Subject to any disclaimer, the term of this patent is extended or adjusted under 35 U.S.C. 154(b) by 6 days.

(21) Appl. No.: 16/697,281

(22) Filed: Nov. 27, 2019

(65) Prior Publication Data

US 2020/0165475 A1   May 28, 2020

(30) Foreign Application Priority Data

Nov. 28, 2018 (JP) .............................. JP2018-222527

(51) Int. Cl.

| | |
|---|---|
| *C08F 2/46* | (2006.01) |
| *C08F 2/50* | (2006.01) |
| *C08G 61/04* | (2006.01) |
| *C09D 11/324* | (2014.01) |
| *C08L 33/08* | (2006.01) |
| *B41M 5/00* | (2006.01) |
| *B41J 11/00* | (2006.01) |
| *B41J 2/21* | (2006.01) |
| *C08K 5/5397* | (2006.01) |

(52) U.S. Cl.
CPC ........... *C09D 11/324* (2013.01); *B41J 2/2107* (2013.01); *B41J 11/002* (2013.01); *B41M 5/0011* (2013.01); *C08K 5/5397* (2013.01); *C08L 33/08* (2013.01)

(58) Field of Classification Search
CPC .............. C08F 220/301; C08F 220/281; C08F 220/1811; C08F 222/102; C08F 226/06; C08F 230/08; C09D 11/324; C09D 11/38; C09D 11/40; C09D 11/101; C09D 133/14; C09D 133/06; C08L 33/08; B41J 11/002; B41J 11/00214; B41J 2/2107; B41M 7/0081

USPC .................................................... 522/1; 520/1
See application file for complete search history.

(56) References Cited

U.S. PATENT DOCUMENTS

| | | | |
|---|---|---|---|
| 7,614,734 B2 | 11/2009 | Konno | |
| 7,862,163 B2 | 1/2011 | Maeno et al. | |
| 9,248,668 B2 | 2/2016 | Mochizuki et al. | |
| 2013/0222497 A1* | 8/2013 | Nakano | C09D 133/08 347/100 |
| 2013/0303682 A1* | 11/2013 | Konda | C09D 11/101 524/548 |
| 2020/0231830 A1* | 7/2020 | Kobayashi | C08L 33/068 |

FOREIGN PATENT DOCUMENTS

| | | | |
|---|---|---|---|
| JP | 2004-285217 | * | 10/2004 |
| JP | 2004-285217 A | | 10/2004 |
| JP | 2005-171134 | * | 6/2005 |
| JP | 2005-171134 A | | 6/2005 |
| JP | 2006-326983 A | | 12/2006 |
| JP | 2007-261203 A | | 10/2007 |
| JP | 2014-083804 A | | 5/2014 |
| WO | WO-2008-084691 A1 | | 7/2008 |

OTHER PUBLICATIONS

Nakamura et al, JP 2004-285217 Machine Translation, Oct. 14, 2004 (Year: 2004).*

Imai et al , JP 2005-171134 Machine Translation, Jun. 30, 2005 (Year: 2005).*

* cited by examiner

*Primary Examiner* — Jessica Whiteley

(74) *Attorney, Agent, or Firm* — Harness, Dickey & Pierce, P.L.C.

(57) ABSTRACT

A radiation-curable ink jet ink set includes a radiation-curable dark-colored ink having a surface tension γ1 and a radiation-curable light-colored ink having a surface tension γ2. The surface tensions of the radiation-curable inks satisfy γ1>γ2.

3 Claims, 2 Drawing Sheets

RADIATION-CURABLE INK JET INK SET AND INK JET PRINTING METHOD

The present application is based on, and claims priority from, JP Application Serial Number 2018-222527, filed Nov. 28, 2018, the disclosure of which is hereby incorporated by reference herein in its entirety.

BACKGROUND

1. Technical Field

The present disclosure relates to a radiation-curable ink jet ink set and an ink jet printing method.

2. Related Art

An ink jet printing method is a technique for printing performed by ejecting ink droplets through very thin nozzles to apply the ink droplets onto a printing medium. This method enables high-speed printing of a high-definition, high-quality image pattern with a relatively inexpensive apparatus.

Apparatuses used in such an ink jet printing method are widely developed for high-quality printing from a variety of viewpoints. Inks, as well as apparatuses, are also developed for improving the quality of ink jet printing products. For example, JP-A-2007-261203 discloses an image forming method of applying a first liquid having a dynamic surface tension of γ1 onto a printing medium and subsequently applying a second liquid having a dynamic surface tension of γ2 that is higher than γ1. According to this method, a phenomenon called droplet interaction is avoided without degrading color reproductivity.

Ink jet printing, which can be performed by using a downsized apparatus and does not require a printing plate, is suitable for producing printed items by small-volume, multi-lot printing, such as label printing and sign printing. Printed items, such as labels, signs, or the like may be produced by, for example, applying a radiation-curable ink capable of being cured by ultraviolet (UV) light or visible light radiation onto a plastic film or board, and curing the ink with UV light or visible light.

When radiation-curable inks are used, however, the method of applying an ink having a higher surface tension after applying an ink having a lower surface tension as disclosed JP-A-2007-261203 is not sufficient to produce high-quality images exhibiting satisfactory color reproduction gamut while appropriately filled with the inks.

SUMMARY

According to an aspect of the present disclosure, a radiation-curable ink jet ink set is provided. The ink set includes a radiation-curable dark-colored ink having a surface tension γ1 and a radiation-curable light-colored ink having a surface tension γ2. The surface tensions of the radiation-curable inks satisfy γ1>γ2.

In the radiation-curable ink jet ink set, γ1−γ2≥5.0 mN/m may hold true.

In the radiation-curable ink jet ink set, at least one of the dark-colored ink and the light-colored ink may contain a compound represented by the following general formula (I) and an acylphosphine oxide-based compound:

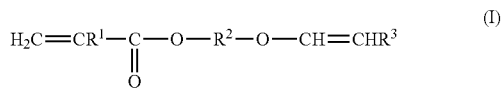

wherein $R^1$ represents a hydrogen atom or a methyl group, $R^2$ represents a divalent organic residue having a carbon number of 2 to 20, and $R^3$ represents a hydrogen atom or a monovalent organic residue having a carbon number of 1 to 11.

According to another aspect of the present disclosure, an ink jet printing method using the above-described radiation-curable ink jet ink set and a serial printing apparatus. The ink jet printing method includes a first ink application step of applying the dark-colored ink onto a printing medium, a first UV irradiation step of irradiating the dark-colored ink on the printing medium with UV light, a second ink application step of applying a light-colored ink onto the printing medium, a second UV irradiation step of irradiating the light-colored ink on the printing medium with UV light, a third ink application step of applying one of the dark-colored ink and the light-colored ink onto one of the dark-colored and the light-colored ink irradiated with the UV light, and a third UV irradiation step of irradiating at least one of the dark-colored and the light-colored ink on the printing medium with UV light. In the irradiation steps, the UV light is emitted from a UV light-emitting diode at 50.0 mJ/cm² or more for every scanning of the printing apparatus.

DESCRIPTION OF EXEMPLARY EMBODIMENTS

Figure 1:
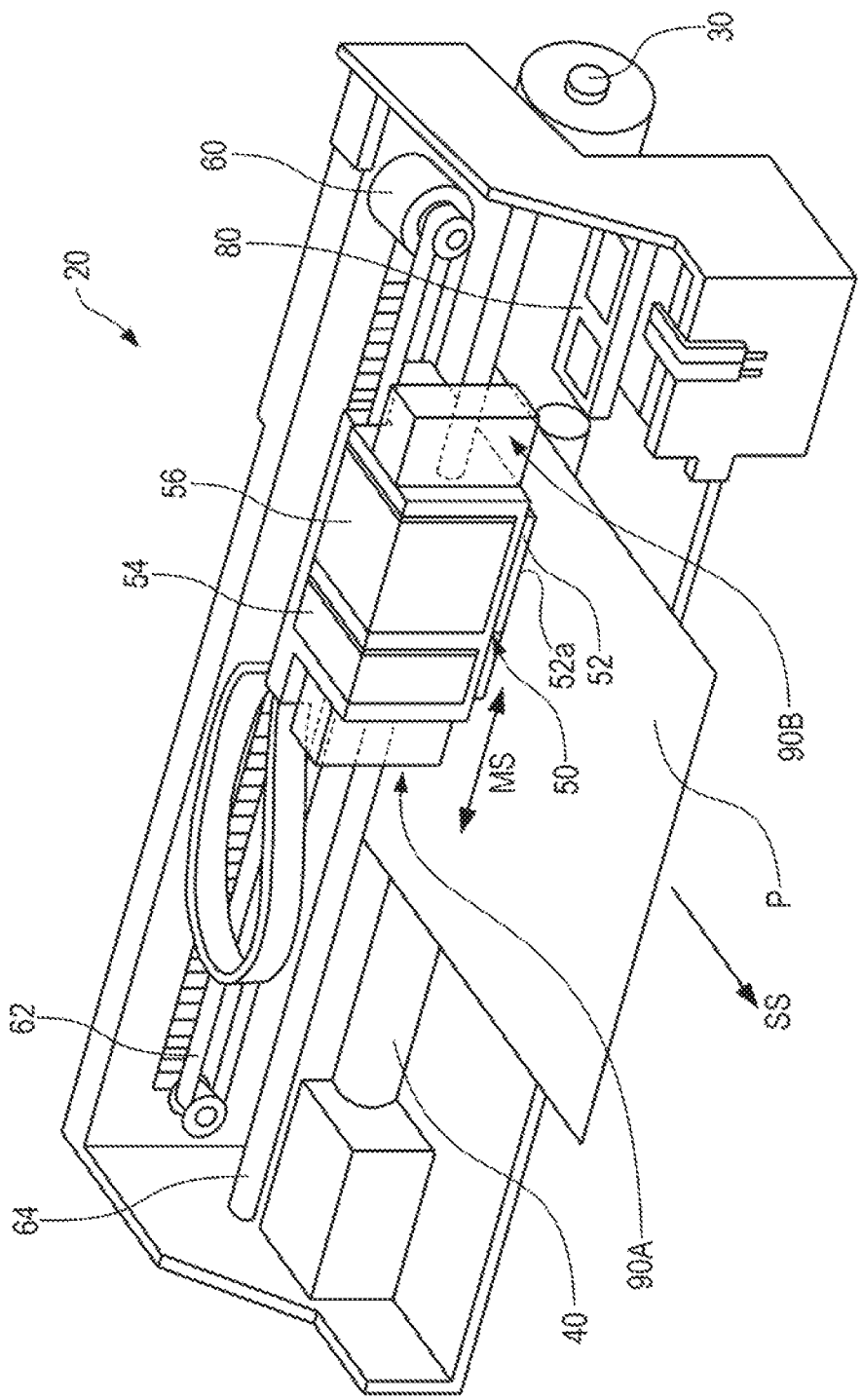
FIG. 1 is a perspective view of an ink jet printing apparatus according to an embodiment of the present disclosure.

Some of the embodiments of the present disclosure will now be described. The following embodiments illustrate some implementations of the present disclosure. The implementation of the subject matter of the disclosure is not limited to the following embodiments, and various modifications may be made within the scope and spirit of the disclosure. All the components disclosed in the following embodiments are not necessarily essential for the subject matter disclosed herein.

1. Radiation-Curable Ink Jet Ink Set

The radiation-curable ink jet ink set according to an embodiment of the present disclosure includes a dark-colored ink and a light-colored ink.

1. 1. Dark-Colored Ink

The dark-colored ink of the ink set of the present embodiment is curable with a radiation. The dark-colored ink contains a polymerizable compound, a polymerization initiator, and a coloring material and, optionally, other constituents. The dark-colored ink is an ink having a higher coloring material content than the light-colored ink when the ink set includes two inks having the same or similar hue. At this time, a coloring material contained in the dark-colored ink and a coloring material contained in the light-colored ink may be the same or different. For example, when the ink set include two cyan inks having different coloring material concentration, the dark-colored ink is the cyan ink having the higher colorant concentration. When the ink set include two cyan inks having different coloring material concentration and two magenta inks having different coloring material concentration, the dark-colored ink is the cyan ink having the higher colorant concentration than another cyan ink and magenta ink having the higher colorant concentration than another magenta ink.

1. 1. (1) Polymerizable Compound

The polymerizable compound is a compound capable of being polymerized with a polymerization initiator and is not otherwise limited. The polymerizable compound may be a monofunctional, bifunctional, or a higher multifunctional monomer or oligomer. Examples of such a monomer include unsaturated carboxylic acids and salts or esters thereof, such as (meth)acrylic acid, itaconic acid, crotonic acid, isocrotonic acid, and maleic acid; urethane; amides and anhydrides thereof; acrylonitrile; styrene; and unsaturated polyesters, unsaturated polyethers, unsaturated polyamides, and unsaturated urethanes.

Examples of such an oligomer include oligomers produced from the above-cited monomers, such as linear (meth) acrylic oligomers, epoxy (meth)acrylates, oxetane (meth) acrylates, aliphatic urethane (meth)acrylates, aromatic urethane (meth)acrylates, and polyester (meth)acrylates.

The polymerizable compound may be any other monofunctional or multifunctional monomer, for example, an N-vinyl compound. Examples of the N-vinyl compound include N-vinylformamide, N-vinylcarbazole, N-vinylacetamide, N-vinylpyrrolidone, N-vinylcaprolactam, acryloyl morpholine, and derivatives thereof.

In the description of the present disclosure, a "(meth) acrylate" refers to either one or both of an acrylate and a corresponding methacrylate, and a (meth)acrylic compound refers to either one or both of an acrylic compound and a corresponding methacrylic compound. Also, an oligomer refers to a dimer or any other lower polymer, produced by polymerization of a monomer and has a weight average molecular weight of 10000 or less. The weight average molecular weight mentioned herein is a measurement of mass spectrometry.

Examples of such a monofunctional (meth)acrylate include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl diglycol (meth)acrylate, 2-hydroxybutyl (meth)acrylate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, tetrahydrofurfuryl (meth)acrylate, isobornyl (meth)acrylate, 2-hydroxyethyl (meth)acrylate, 2-hydroxypropyl (meth)acrylate, flexible lactone-modified (meth)acrylate, t-butylcyclohexyl (meth)acrylate, dicyclopentanyl (meth)acrylate, and dicyclopentenyloxyethyl (meth)acrylate.

Exemplary bifunctional (meth)acrylates include 1,6-hexanediol di(meth)acrylate, 1,10-decanediol di(meth)acrylate, 2,4-dimethyl-1,5-pentanediol di(meth)acrylate, ethoxylated cyclohexane methanol di(meth)acrylate, polyethylene glycol di(meth)acrylate, oligoethylene glycol di(meth)acrylate, 2-ethyl-2-butyl-butanediol di(meth)acrylate, hydroxypivalic acid neopentyl glycol di(meth)acrylate, ethylene oxide (EO)-modified bisphenol A di(meth)acrylate, bisphenol F polyethoxy di(meth)acrylate, polyethylene glycol di(meth) acrylate, polypropylene glycol di(meth)acrylate, oligopropylene glycol di(meth)acrylate, 2-ethyl-2-butylpropanediol di(meth)acrylate, 1,9-nonanediol di(meth)acrylate, propoxylated-ethoxylated bisphenol A di(meth)acrylate, tricyclodecane di(meth)acrylate, polytetramethylene glycol di(meth)acrylate, acrylated amine compounds produced by a reaction of 1,6-hexanediol di(meth)acrylate with an amine compound, 1,6-hexanediol di(meth)acrylate, bisphenol A-ethylene oxide (EO) adduct di(meth)acrylate, and bisphenol A-propylene oxide (PO) adduct di(meth)acrylate.

Exemplary trifunctional (meth)acrylates include trimethylolpropane tri(meth)acrylate, trimethylolethane tri(meth) acrylate, alkylene oxide-modified trimethylolpropane tri (meth)acrylate, pentaerythritol tri(meth)acrylate, dipentaerythritol tri(meth)acrylate, trimethylolpropane tri ((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivalic aldehyde-modified dimethylolpropane tri(meth)acrylate, sorbitol tri(meth)acrylate, glycerin propoxy tri(meth)acrylate, propoxylated trimethylolpropane tri(meth)acrylate, ethoxylated glycerin triacrylate, and caprolactone-modified trimethylolpropane tri(meth) acrylate.

Exemplary tetrafunctional (meth)acrylates include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Exemplary pentafunctional (meth)acrylates include sorbitol penta(meth)acrylate, dipentaerythritol penta(meth) acrylate, ditrimethylolpropane penta(meth)acrylate, propionic acid-modified dipentaerythritol penta(meth)acrylate, propionic acid-modified tripentaerythritol penta(meth)acrylate, propionic acid-modified tetrapentaerythritol penta(meth)acrylate, and EO or PO adducts thereof.

Exemplary hexafunctional (meth)acrylates include sorbitol hexa(meth)acrylate, ditrimethylolpropane hexaacrylate, dipentaerythritol hexa(meth)acrylate, tripentaerythritol hexa (meth)acrylate, alkylene oxide-modified phosphazene hexa (meth)acrylate, caprolactone-modified dipentaerythritol hexa(meth)acrylate, propionic acid-modified tripentaerythritol hexa(meth)acrylate, propionic acid-modified tetrapentaerythritol hexa(meth)acrylate, and EO or PO adducts thereof.

Exemplary heptafunctional or higher functional (meth) acrylates include tripentaerythritol hepta(meth)acrylate, propionic acid-modified tripentaerythritol hepta(meth)acrylate, propionic acid-modified tetrapentaerythritol hepta(meth) acrylate, tripentaerythritol octa(meth)acrylate, propionic acid-modified tetrapentaerythritol octa(meth)acrylate, tetrapentaerythritol nona(meth)acrylate, propionic acid-modified tetrapentaerythritol nona(meth)acrylate, tetrapentaerythritol deca(meth)acrylate, pentaerythritol undeca(meth)acrylate, pentaerythritol dodeca(meth)acrylate, and EO or PO adducts thereof.

The dark-colored ink according to the present embodiment may contain a (meth)acrylic ester having a vinyl ether group, represented by the following general formula (I):

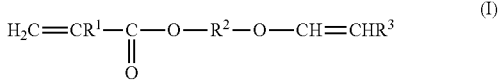

wherein R$^1$ represents a hydrogen atom or a methyl group, R$^2$ represents a divalent organic residue having a carbon number of from 2 to 20, and R$^3$ represents a hydrogen atom or a monovalent organic residue having a carbon number of from 1 to 11.

Examples of such a (meth)acrylic ester having a vinyl ether group include 2-vinyloxyethyl (meth)acrylate, 3-vinyloxypropyl (meth)acrylate, 1-methyl-2-vinyloxyethyl (meth)acrylate, 2-(2-vinyloxyethoxy)ethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(2-vinyloxyethoxy)isopropyl (meth)acrylate, 2-(vinyloxyisopropoxy) propyl (meth)acrylate, 2-(vinyloxyisopropoxy) isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy) propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, polyethylene glycol monovinyl ether (meth)acrylate, and polypropylene glycol monovinyl ether (meth)acrylate.

By adding a (meth)acrylic ester having a vinyl ether group represented by general formula (I) as a polymerizable compound, the curability of the dark-colored ink can be dramatically increased without increasing viscosity. One of the reasons for this is that such a compound is a bifunctional monomer having in the molecule both a (meth)acryloyl group and a vinyl ether group that are different in polymerizability.

The dark-colored ink may further contain a compound belonging to glycol-based di(meth)acrylate. Examples of such a compound include ethylene glycol di(meth)acrylate, diethylene glycol di(meth)acrylate, triethylene glycol di(meth)acrylate, propylene glycol di(meth)acrylate, dipropylene glycol di(meth)acrylate, tripropylene glycol di(meth)acrylate, 1,4-butanediol di(meth)acrylate, 1,3-butanediol di(meth)acrylate, dibutylene glycol di(meth)acrylate, tributylene glycol di(meth)acrylate, tetrabutylene glycol di(meth)acrylate, 1,5-pentanediol di(meth)acrylate, 1,4-pentanediol di(meth)acrylate, 1,3-pentanediol di(meth)acrylate, dipentylene glycol di(meth)acrylate, tripentylene glycol di(meth)acrylate, cyclopentanediol di(meth)acrylate, and neopentyl glycol di(meth)acrylate.

The (meth)acrylate added as a polymerizable compound may have one or more saturated or unsaturated alicyclic skeletons. Such a skeleton acts to adjust the glass transition temperature of the cured product of the ink. Examples of (meth)acrylates having a saturated alicyclic skeleton include isobornyl (meth)acrylate, t-butylcyclohexyl (meth)acrylate, and dicyclopentanyl (meth)acrylate. An example of (meth)acrylates having an unsaturated alicyclic skeleton is dicyclopentenyloxyethyl (meth)acrylate.

Also, the (meth)acrylate added as a polymerizable compound may have an aromatic ring skeleton. Examples of (meth)acrylates having an aromatic ring skeleton include phenoxyethyl (meth)acrylate, 2-hydroxy-3-phenoxypropyl (meth)acrylate, benzyl (meth)acrylate, phenoxydiethylene glycol (meth)acrylate, nonylphenoxyethyl (meth)acrylate, and alkoxylated phenoxyethyl (meth)acrylate.

A single polymerizable compound may be used, or two or more polymerizable compounds may be used in combination. The lower limit of the total content of the polymerizable compound(s) may be, but is not limited to, 30.0% by mass or more, 50.0% by mass or more, or 60.0% by mass or more relative to the total mass (100% by mass) of the dark-colored ink. In some embodiments, it may be 70.0% by mass or more. Also, the upper limit of the total content of the polymerizable compound(s) may be, but is not limited to, 95.0% by mass or less, 90.0% by mass or less, or 85.0% by mass or less relative to the total mass (100% by mass) of the dark-colored ink. In some embodiments, it may be 80.0% by mass or less.

1. 1. (2) Polymerization Initiator

The polymerization initiator contained in the dark-colored ink according to the present embodiment is used for polymerization caused by irradiation with a radiation, such as UV light or visible light, to cure the ink, thus forming print. UV light is favorable in terms of safety, and the use thereof as radiation reduces the cost of the light source. Any polymerization initiator may be used without limitation, provided that the polymerization initiator can produce active species, such as radicals or cations, with UV energy or any other radiation energy and initiates the polymerization of the polymerizable compound in the ink. For example, a radical polymerization initiator or a cationic polymerization initiator may be used. In some embodiments, a radical polymerization initiator may be used.

Examples of the radical polymerization initiator include aromatic ketones, acylphosphine oxide compounds, aromatic onium salts, organic peroxides, thio compounds (such as thioxanthone compounds and thiophenyl group-containing compounds), hexaaryl biimidazole compounds, ketoxime ester compounds, borates, azinium compounds, metallocene compounds, active ester compounds, compounds having a carbon-halogen bond, and alkylamine compounds.

In some embodiments, at least either an acylphosphine oxide compound or a thioxanthone compound may be used. Such a compound increases the curability of the dark-colored ink.

More specifically, examples of the radical polymerization initiator include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholinopropan-1-one, bis(2,4,6-trimethylbenzoyl)phenylphosphine oxide, 2,4,6-trimethylbenzoyldiphenylphosphine oxide, 2,4-diethylthioxanthone, and bis-(2,6-dimethoxybenzoyl)-2,4,4-trimethylpentylphosphine oxide.

In some embodiments, 2,4,6-trimethylbenzoyldiphenylphosphine oxide, bis(2,4,6-trimethylbenzoyl)phenylphosphine oxide, or 2,4-diethylthioxanthone may be used.

The radical polymerization initiator is commercially available, and examples thereof include IRGACURE 651 (2,2-dimethoxy-1,2-diphenylethan-1-one), IRGACURE 184 (1-hydroxycyclohexylphenyl ketone), DAROCUR 1173 (2-hydroxy-2-methyl-1-phenylpropan-1-one), IRGACURE 2959 (1-[4-(2-hydroxyethoxy)phenyl]-2-hydroxy-2-methyl-1-propan-1-one), IRGACURE 127 (2-hydroxy-1-{4-[4-(2-hydroxy-2-methylpropionyl)benzyl]phenyl}-2-methyl-propan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)butanone-1), IRGACURE 379 (2-(dimethylamino)-2-[(4-methylphenyl)methyl]-1-[4-(4-morpholinyl)phenyl]-1-butanone), DAROCUR TPO (2,4,6-trimethylbenzoyldiphenylphosphine oxide), IRGACURE 819 (bis(2,4,6-trimethylbenzoyl)phenylphosphine oxide), IRGACURE TPO (2,4,6-trimethylbenzoyldiphenylphosphine oxide), IRGACURE 784 (bis(η5-2,4-cyclopentadien-1-yl)-bis(2,6-difluoro-3-(1H-pyrrol-1-yl)phenyl) titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), and IRGACURE 754 (mixture of oxyphenylacetic acid, 2-[2-oxo-2-phenylacetoxyethoxy]ethyl ester, and 2-(2-hydroxyethoxy)ethyl ester) (all produced by BASF); KAYACURE DETX-S (2,4-diethylthioxanthone) (produced by Nippon Kayaku Co. Ltd.); Lucirin TPO, LR8893, and LR8970 (all produced by BASF); and Ubecryl P36 (produced by UCB).

The above-cited polymerization initiators may be used individually or in combination.

From the viewpoint of increasing the curability of the dark-colored ink and avoiding stain with the polymerization initiator or a residue of undissolved polymerization initiator, the polymerization initiator content may be in the range of 1.0% by mass to 20.0% by mass relative to the total mass (100% by mass) of the dark-colored ink.

When an acylphosphine oxide-based compound is used as at least a portion of the polymerization initiator, the content of the acylphosphine oxide-based compound may be in the range of 7.0% by mass to 15.0% by mass, 8.0% by mass to 15.0% by mass, or 10.0% by mass to 14.0% by mass relative to the total mass (100% by mass) of the dark-colored ink. When the content of the acylphosphine oxide-based compound is in such a range, the compound can be sufficiently dissolved in the dark-colored ink, and the resulting dark-colored ink can exhibit high curability. In addition, the dark-colored ink containing a compound represented by general formula (I) as the polymerizable compound is compatible with acylphosphine oxide-based compounds. Accordingly, the use of an acylphosphine oxide-based compound leads to an increased curability of the ink.

When a thioxanthone compound is used as at least a part of the polymerization initiator, the content of the thioxanthone compound may be in the range of 0.5% by mass to 4.0% by mass or 1.0% by mass to 3.0% by mass relative to the total mass (100% by mass) of the dark-colored ink. When the content of the thioxanthone compound is in such a range, the dark-colored ink can exhibit high curability.

1. 1. (3) Coloring Material

The dark-colored ink contains a coloring material. The coloring material may be either one or both of a pigment and a dye.

Pigment

The use of a pigment enhances the weather fastness of the dark-colored ink. The pigment may be an inorganic pigment or an organic pigment.

Exemplary inorganic pigments include carbon blacks (C.I. Pigment Black 7), such as furnace black, lamp black, acetylene black, and channel black; iron oxide; and titanium oxide.

Examples of the organic pigment include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments.

Examples of black pigments include No. 2300, No. 900, MCF 88, No. 33, No. 40, No. 45, No. 52, MA 7, MA 8, MA 100, and No. 2200B (all produced by Mitsubishi Chemical Corporation); Raven 5750, Raven 5250, Raven 5000, Raven 3500, Raven 1255, and Raven 700 (all produced by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all available from Cabot JAPAN K. K.); and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (all produced by Degussa).

Examples of white pigments include C.I. Pigment Whites 6, 18, and 21 and metal compounds, such as metal oxides, barium sulfate, and calcium carbonate. Examples of the metal oxides include titanium dioxide, zinc oxide, silica, alumina, and magnesium oxide.

Examples of yellow pigments include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violets 19, 23, 32, 33, 36, 38, 43, and 50.

Examples of cyan pigments include C.I. Pigment Blues 1, 2, 3, 15, 15:1, 15:2, 15:3, 15:34, 15:4, 16, 18, 22, 25, 60, 65, and 66 and C.I. Vat Blues 4 and 60.

Pigments that can be used for colors other than magenta, cyan, and yellow include C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

The above-cited pigments may be used individually or in combination.

When any one of the above-cited pigments is used, the average particle size of the pigment may be 300.0 nm or less and may be in the range of 50.0 nm to 200.0 nm. When the pigment has such an average particle size, the dark-colored ink can be reliable in terms of, for example, ejection consistency and dispersion stability, accordingly forming high-quality images. Average particle size mentioned herein is a value measured by dynamic light scattering.

Dye

A dye may be used as the coloring material. The dye may be, but is not limited to, an acid dye, a direct dye, a reactive dye, or a basic dye. Examples of such a dye include C.I. Acid Yellows 17, 23, 42, 44, 79, and 142, C.I. Acid Reds 52, 80, 82, 249, 254, and 289, C.I. Acid Blues 9, 45, and 249, C.I. Acid Blacks 1, 2, 24, and 94, C.I. Food Blacks 1 and 2, C.I. Direct Yellows 1, 12, 24, 33, 50, 55, 58, 86, 132, 142, 144, and 173, C.I. Direct Reds 1, 4, 9, 80, 81, 225, and 227, C.I. Direct Blues 1, 2, 15, 71, 86, 87, 98, 165, 199, and 202, C.I. Direct Blacks 19, 38, 51, 71, 154, 168, 171, and 195, and C.I. Reactive Reds 14, 32, 55, 79, and 249, and C.I. Reactive Blacks 3, 4, and 35.

Such dyes may be used individually or in combination. Both a pigment and a dye may be used in combination. The coloring material content may be 0.5% by mass to 10% by mass relative to the total mass (100% by mass) of the dark-colored ink from the viewpoint of obtaining satisfactory color reproduction.

1. 1. (4) Other Constituents

The dark-colored ink according to the present embodiment may further contain a dispersant. For the dark-colored ink containing a pigment, a dispersant may be added for favorable dispersion of the pigment. The dispersant may be, but is not limited to, a polymer dispersant or the like that is conventionally used for preparing a pigment dispersion. Examples of such a polymer dispersant include polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. The polymer dispersant may contain at least one of these polymers as the main constituent. The polymer dispersant may be commercially available, and examples thereof include Discol series produced by Dai-ichi Kogyo Seiyaku Co., Ltd., Solsperse series, such as Solsperse 36000, produced by Lubrizol Corporation, and Disper BYK series produced by BYK Chemie.

The dark-colored ink according to the present embodiment may further contain a slipping agent (surfactant) from the viewpoint of increasing rub fastness. The slipping agent may be, but is not limited to, a silicone surfactant. The silicone surfactant may be a polyester-modified or polyether-modified silicone. In some embodiments, polyether-modified polydimethylsiloxane or polyester-modified polydimethylsiloxane may be used. Examples of such a slipping agent include BYK-347, BYK-348, BYK-UV3500, UV3510, -UV3530, and -UV3570 (all available from BYK Japan KK). A polyacrylate-based surfactant may also be used, and examples thereof include BYK-350, BYK-352, BYK-354, and BYK-355.

The dark-colored ink according to the present embodiment may further contain a polymerization inhibitor. The addition of a polymerization inhibitor enhances the storage stability of the dark-colored ink. The polymerization inhibitor may be, but is not limited to, at least one selected from the group consisting of phenol compounds, hydroquinone compounds, and quinone compounds. More specifically, examples of such a polymerization inhibitor include hydroquinone, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol). A commercially available polymerization inhibitor, such as IRGASTAB UV10 or UV22 (both produced by BASF), may be used.

The dark-colored ink according to the present embodiment may further contain other constituents or additives. Such constituents include known additives including a polymerization promoter (sensitizing dye or the like) and a penetration enhancer. Other additives include a fixing agent, a fungicide, a preservative, an antioxidant, an ultraviolet absorbent, a chelating agent, a pH adjuster, and a thickener.

1. 2. Light-Colored Ink

As with the dark-colored ink, the light-colored ink of the ink set of the present embodiment is curable with a radiation. The light-colored ink contains a polymerizable compound, a polymerization initiator, and a coloring material and, optionally, other constituents. The light-colored ink is an ink having a lower coloring material content than the dark-colored ink when the ink set includes two inks having the same or similar hue. At this time, a coloring material contained in the light-colored ink and a coloring material contained in the dark-colored ink may be the same or different. For example, when the ink set include two cyan inks having different coloring material concentration, the light-colored ink is the cyan ink having the lower colorant concentration.

The light-colored ink has a lower coloring material content than the dark-colored ink. The constituents and the contents thereof in the light-colored ink, except for the coloring material, are the same as those described for the dark-colored ink, provided that the dark-colored ink in the description is replaced with the light-colored ink, and thus description thereof is omitted. In the following description, the difference of the light-colored ink from the dark-colored ink will mainly be described. The constituents other than the coloring material and the contents thereof in the light-colored ink and the dark-colored ink may be the same or different between the inks. In other words, the light-colored ink and the dark-colored ink may be different in only coloring material content or in constituents, including the coloring material, and the contents thereof.

The polymerizable compound that may be contained in the light-colored ink and the content thereof are determined as described for the dark-colored ink. As with the dark-colored ink, the light-colored ink may contain a (meth) acrylic ester having a vinyl ether group, represented by general formula (I). The (meth)acrylic ester having a vinyl ether group represented by general formula (I) contained in either one or both of the dark-colored ink and the light-colored ink can dramatically increase the curability of at least one of the dark-colored ink and the light-colored ink.

The polymerization initiator that may be contained in the light-colored ink and the content thereof are determined as described for the dark-colored ink. In addition, the light-colored ink containing a compound represented by general formula (I) as the polymerizable compound is compatible with acylphosphine oxide-based compounds, which are often used as a polymerization initiator, and thus results in an increased curability.

If a compound represented by general formula (I) and an acylphosphine oxide-based polymerization initiator are added to only either the dark-colored ink or the light-colored ink, these compounds are desirably added to the dark-colored ink. The dark-colored ink tends to be inferior in curability to the light-colored ink.

The coloring material contained in the light-colored ink is determined as described for the dark-colored ink.

The coloring material content in the light-colored ink is 0.01 to 0.80, 0.10 to 0.70, or 0.20 to 0.50 relative to that in the dark-colored ink (on a mass basis). Particularly when the dark-colored ink and the light-colored ink contain the same coloring material, the coloring material content in the light-colored ink is 0.10 to 0.70, 0.15 to 0.50, or 0.20 to 0.30 relative to the coloring material content in the dark-colored ink (on a mass basis).

Other constituents that may be added to the light-colored ink and the contents thereof are determined as described for the dark-colored ink. The dispersant content is, however, adjusted according to the content of the coloring material in the light-colored ink.

1. 3. Surface Tensions of Dark-colored Ink and Light-Colored Ink

In the radiation-curable ink jet ink set of the present embodiment, the surface tension $\gamma1$ of the dark-colored ink and the surface tension $\gamma2$ of the light-colored ink satisfy the following relationship (1): $\gamma1 > \gamma2$.

Hence, the dark-colored ink has a larger surface tension than the light-colored ink.

In some embodiments, the surface tensions $\gamma1$ and $\gamma2$ may satisfy $\gamma1 - \gamma2 \geq 5.0$ mN/m.

Hence, the surface tension of the dark-colored ink may be higher than the surface tension of the light-colored ink by 5.0 mN/m or more. In an embodiment, the surface tension of the dark-colored ink may be higher than that of the light-colored ink by 6.0 mN/m or more or 7.0 mN/m or more.

In an embodiment, for example, the surface tension of the dark-colored ink may be 35.0 mN/m or less or 32.0 mN/m or less, and the surface tension of the light-colored ink may be 30.0 mN/m or less, 25.0 mN/m or less, or 22.0 mN/m or less.

The surface tension of the individual inks may be controlled by, for example, varying the polymerizable compound and/or other constituents and the proportions thereof.

The surface tension of the inks is desirably low from the viewpoint of increasing wettability on the printing medium, but is desirably high from the viewpoint of increasing the contact angle of the ink on the printing medium.

The surface tension can be determined by measuring the ink wetting a platinum plate at 25.0° C. with an automatic surface tensiometer CBVP-Z (manufactured by Kyowa Interface Science).

1. 4. Other Inks

The radiation-curable ink jet ink set disclosed herein may include other radiation-curable inks provided that it includes the dark-colored ink and the light-colored ink. In an embodiment, the radiation-curable ink jet ink set may include a plurality of pairs of a dark-colored ink and a light-colored ink. In this instance, at least any one of the pairs satisfy the above described relationship (1).

The number of the inks of the radiation-curable ink jet ink set disclosed herein may be, but is not limited to, 6 or more or 7 or more. The number of colors of the inks included in the radiation-curable ink jet ink set may be, but is not limited to, 8: dark black (DK), light black (LK), dark cyan (DC), light cyan (LC), dark magenta (DM), light magenta (LM), dark yellow (DY), and light yellow (LY). Since the optical density of yellow ink itself is low, seven colors except for light yellow (LY) may be used.

1. 5. Effects

The radiation-curable ink jet ink set disclosed herein includes a radiation-curable dark-colored ink having a surface tension $\gamma1$ and a radiation-curable light-colored ink having a surface tension $\gamma2$, and the surface tensions of the radiation-curable inks satisfy $\gamma1 > \gamma2$. This ink set can produce images in which the portion of the images in the high-duty region has colors satisfactorily developed and favorably reproduced in a wide gamut while the portion of the images in the low-density region is sufficiently filled with inks. Duty, color reproduction gamut, filling property, and the mechanism will be described in detail.

2. Ink Jet Printing Method

The ink jet printing method disclosed herein uses the above-described radiation-curable ink jet ink set and a serial printing apparatus. This method includes a first ink application step of applying the dark-colored ink onto a printing medium, a second ink application step of applying the light-colored ink onto the printing medium, and a UV irradiation step of irradiating at least one of the dark-colored and the light-colored ink on the printing medium with UV light.

In an embodiment, the ink jet printing method include a first ink application step of applying the dark-colored ink onto a printing medium, a first UV irradiation step of irradiating the dark-colored ink on the printing medium with UV light, a second ink application step of applying the light-colored ink onto the printing medium, and a second UV irradiation step of irradiating the light-colored ink on the printing medium with UV light, a third ink application step of applying one of the dark-colored ink and the light-colored ink onto one of the dark-colored and the light-colored ink irradiated with the UV light, and a third UV irradiation step of irradiating at least one of the dark-colored and the light-colored ink on the printing medium with UV light.

Before describing the steps of the method, the serial ink jet printing apparatus and the printing medium will first be described.

2. 1. Ink Jet Printing Apparatus

Figure 2:
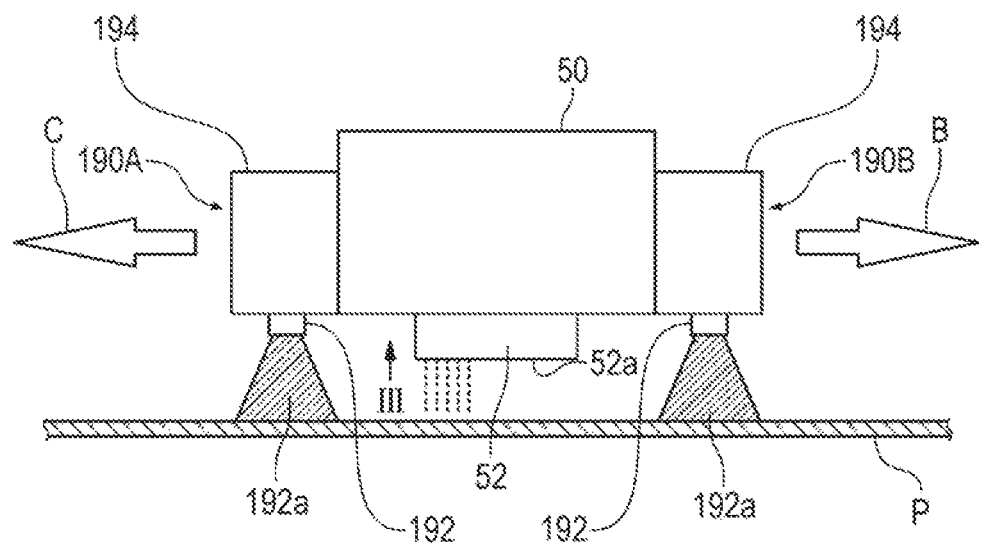
FIG. 2 is a front view of a UV irradiation device used in the printing apparatus shown in FIG. 1.
Figure 3:
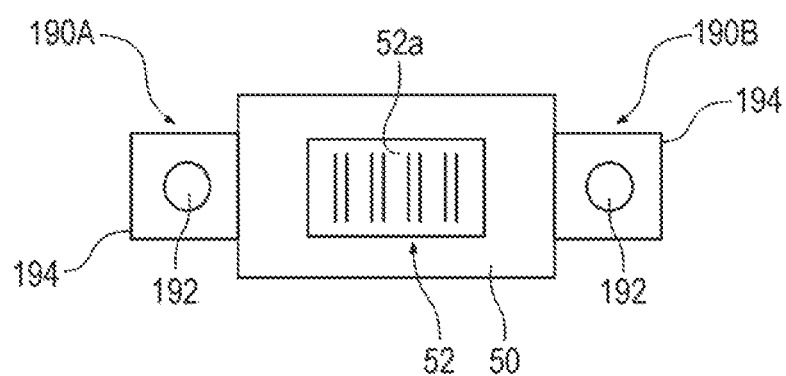
FIG. 3 is an illustrative representation of the irradiation device shown in FIG. 2 viewed in the direction indicated by arrow III.

The ink jet printing apparatus shown in FIG. 1 may be used in the ink jet printing method disclosed herein. FIG. 1 is a perspective view of an ink jet printing apparatus. FIG. 2 is a front view of UV irradiation devices 90A (190A in FIG. 2) and 90B (190B in FIG. 2) shown in FIG. 1. FIG. 3 is an illustrative representation of the irradiation device shown in FIG. 2 viewed in the direction of arrow III.

The ink jet printing apparatus 20 shown in FIG. 1 includes a motor 30 operable to transport the printing medium P in a sub-scanning direction SS, a platen 40, a printing head 52 operable to eject very small droplets of the inks of the radiation-curable ink jet ink set through the nozzles onto the printing medium P, a carriage 50 on/in which the printing head 52 is mounted, a carriage motor 60 operable to move the carriage 50 in a scanning direction MS, and a pair of UV irradiation devices 90A and 90B operable to irradiate droplets of the inks applied onto the printing medium P from the printing head 52 with a radiation.

The carriage 50 is drawn by a traction belt 62 driven by the carriage motor 60, thereby moving along a guide rail 64.

The printing head 52, which is mounted in the carriage 50, is moved in a scanning direction MS by the movement of the carriage 50 in the scanning direction MS.

The printing head 52 is operable to eject the inks of the radiation-curable ink jet ink set. The printing head 52 shown in FIG. 1 is of serial type and has a large number of head nozzles for each color. In the carriage 50 in which the printing head 52 is mounted, a black cartridge 54 that is a black ink container charged with a black ink to be fed to the printing head 52 and a color ink cartridge 56 that is a color ink container charged with a color ink to be fed to the printing head 52 are also mounted. The inks in the cartridges 54 and 56 constitute a radiation-curable ink jet ink set.

In the individual ink application steps, the volume of droplets ejected from the printing head 52 may be in the range of 1 pL to 20 pL per a droplet. By controlling the volume of droplets in this range, the radiation-curable inks can be consistently ejected, thus forming high-quality images.

The carriage 50 is provided with a capping device 80 at the home position thereof (on the right side of FIG. 1). The capping device 80 is operable to cover the nozzle face 52a of the printing head 52 when the printing operation is stopped. On completing a printing job, the carriage 50 returns to the position right above the capping device 80, and the capping device 80 is automatically lifted by a mechanism (not shown) to cover the nozzle face 52a of the printing head 52. This capping operation prevents the ink in the nozzles from drying or deteriorating. The carriage 50 is positioned, for example, so as to be accurately aligned with the position of the capping device 80.

A wiping unit (not shown) may be provided at the home position (on the right side of FIG. 1) of the carriage 50 to wipe the nozzle face 52a of the printing head 52 when a printing operation is stopped. The wiping unit is disposed so as not to interfere with the capping device 80 and is configured so that the wiper blade, or squeegee, thereof rubs the nozzle face 52a of the printing head 52 to remove droplets or mist stuck to the nozzle face 52a and/or the cured product of the droplets or mist.

The ink jet printing apparatus 20 having such a structure is operable to eject and apply droplets of the radiation-curable inks onto a printing medium to form a coating on the printing medium. The ink jet printing apparatus 20 performs the operation for ink application steps and the operation for the UV irradiation steps in a continuous process in one apparatus without using individual devices for the respective operations.

The radiation may be UV light or visible light. In some embodiments, UV light may be used to cure the radiation-curable inks of the radiation-curable ink jet ink set from the viewpoint of preventing the ink from being cured by environmental light and allowing secure handling. For irradiation with the radiation, the UV irradiation device shown in FIGS. 1 and 2 may be used.

As shown in FIGS. 1 to 3, the UV irradiation devices 190A and 190B are disposed on both ends of the carriage 50 in the direction in which the carriage 50 moves.

The UV irradiation device 190A to the left of the printing head 52 irradiates the droplets ejected onto the printing medium P with UV light during scanning in the right direction in which the carriage 50 moves to the right (in the direction indicated by arrow B in FIG. 2) as shown in FIG. 2. The UV irradiation device 190B to the right of the printing head 52 irradiates the droplets ejected onto the printing medium P with UV light during scanning in the left direction in which the carriage 50 moves to the left (in the direction indicated by arrow C in FIG. 2) as shown in FIG. 2.

The UV irradiation devices 190A and 190B, which are attached to the carriage 50, each includes a housing 194 holding a UV light source 192 and a light source control circuit (not shown) operable to control the turn-on and turn-off of the UV light source 192. In the embodiment shown in FIGS. 2 and 3, the UV irradiation devices 190A and 190B are each provided with a single UV light source 192. In another embodiment, however, each irradiation device may have two or more UV light sources. The UV light source 192 may be an LED (light emitting diode) or an LD (laser diode). Such a light source does not require a filter or the like unlike other light sources such as mercury lamps and metal halide lamps, accordingly avoiding an increase in size thereof due to the filter. In addition, since the radiation emitted from the light source is not absorbed by the filter, the radiation maintains an intensity sufficient to cure the radiation-curable ink efficiently.

The wavelengths of the radiation emitted from the UV light sources 192 may be the same or different. When an LED or an LD is used as the UV light source 192, the wavelength of the radiation emitted therefrom can be in the range of 350.0 nm to 430.0 nm.

When the UV irradiation devices 190A and 190B are used, the UV light sources 192 emit radiation 192a to a portion of the printing medium P in the vicinity of the printing head 52, as shown in FIG. 2, to irradiate the droplets applied onto the printing medium P by ejection from the printing head 52, thus curing at least the surface of the droplets to form an image.

A process for forming an image in a desired region that is performed by repeating the ink application steps and the UV irradiation steps will now be described in detail.

First, droplets of one or more color radiation-curable inks are ejected onto the printing medium P and irradiated with the radiation from the UV irradiation device 190A with the carriage 50 moving in the right direction (the direction indicated by arrow B in FIG. 2). Then, the printing medium P is transported in the sub-scanning direction SS. In the description disclosed herein, the operation of ejecting droplets with the carriage 50 moving in either of the scanning directions MS and irradiating the droplets with a radiation is referred to as scanning, and one time of scanning is referred to as one pass.

Subsequently, droplets of one or more colors are ejected onto the printing medium P and irradiated with the radiation from the UV irradiation device 190B with the carriage 50 moving in the left direction (the direction indicated by arrow C in FIG. 2) in the same manner as above, thus further performing scanning once (one pass). At this time, the coating on the printing medium is irradiated with the radiation from the UV irradiation devices 190A and 190B. Then, the printing medium P is transported in the sub-scanning direction SS.

Up to the operation just described, the coating formed by the first pass is irradiated with a radiation by two passes. More specifically, this coating is subjected to irradiation once by the first pass and then subjected to irradiation twice by the second pass, hence three times in total. On the other hand, the coating formed by the second pass is irradiated once with the radiation by one pass.

Such a sequence of operations is repeated to form a mass of coatings defining an image in a predetermined region.

The ink jet printing apparatus 20 used in an embodiment of the present disclosure may further include an additional radiation irradiation device (not shown) downstream in the sub-scanning direction SS in which the printing medium P is transported. Thus, the coating on the printing medium is fully cured after an image formation on the printing medium has been completed through all the passes that should be performed.

For example, even if the cumulative irradiation energy of the radiation emitted from the UV irradiation devices 190A and 190B is not sufficient to fully cure the droplets, including the inner portion, on the printing medium P, the additional radiation irradiation device downstream in the sub-scanning direction SS ensures complete cure of the droplets including the inner portion.

The additional radiation irradiation device may be disposed anywhere provided that it can irradiate the droplets on the printing medium P transported in the sub-scanning direction SS. For example, the additional radiation irradiation device may be disposed above the carriage 50 and downstream from the printing head 52 in the sub-scanning direction SS in which the printing medium P is transported. The additional radiation irradiation device downstream in the sub-scanning direction may be the same as the UV irradiation device 190A (190B).

2. 2. Printing Medium

The printing medium used in the ink jet printing method disclosed herein is in the form of a film or a board.

The printing medium may be unabsorbent of liquid, and examples of such a printing medium include films and plates made of a polymer, such as polyvinyl chloride, polyethylene terephthalate, polycarbonate, polystyrene, polyurethane, polyethylene, polypropylene, polyvinyl acetal, and a mixture thereof; films and plates made of cellulose diacetate, cellulose triacetate, cellulose propionate, cellulose butyrate, cellulose acetate butyrate, cellulose nitrate, or the like; and foils and plates made of a metal, such as iron, silver, copper, or aluminum; plates and films on which such a metal is deposited; foils and plates of an alloy, such as stainless steel or brass; and glass plates.

The printing medium may be poorly absorbent of liquid. Such a printing medium may include a coating (liquid-receiving layer) at the surface thereof and, for example, may be any of the above-cited films and plates, coated with a hydrophilic polymer or a layer formed by applying silica or titanium particles with a binder (for example, a hydrophilic polymer, such as polyvinyl alcohol or polyvinylpyrrolidone). The substrate of the printing medium poorly absorbent of liquid may be paper, and an example of such a printing medium is book-printing paper, such as art paper, coated paper, or matte paper.

A printing medium poorly absorbent or unabsorbent of liquid refers to a printing medium that is hardly absorbent or not absorbent of liquid. Quantitatively, the printing medium poorly absorbent or unabsorbent of liquid exhibits a water absorption of 10 mL/m$^2$ or less for a period of 30 ms$^{1/2}$ from the beginning of contact with water, measured by the Bristow's method. The Bristow's method is broadly used for measuring liquid absorption in a short time, and Japan Technical Association of the Pulp and Paper Industry (JAPAN TAPPI) officially adopts this method. Details of this method are specified in Standard No. 51 (Paper and Paperboard—Liquid Absorption Test Method—Bristow's Method (in Japanese)) of JAPAN TAPPI Paper and Pulp Test Methods edited in 2000 (in Japanese). In contrast, printing media absorbent of liquid refer to those not belonging to the category of the printing media poorly absorbent or unabsorbent of liquid. In the description disclosed herein, being unabsorbent of liquid, poorly absorbent of liquid, or absorbent of liquid may be merely expressed as being unabsorbent, poorly absorbent, and absorbent, respectively.

The printing medium may be transparent and colorless, translucent, colored and transparent, colored and opaque, or non-colored and opaque. The printing medium itself may be colored or may be transparent or translucent.

In some embodiments, the printing medium may be unabsorbent or poorly absorbent of liquid. In some embodiments, the printing medium may contain a plasticizer. Such a printing medium may be a polyvinyl chloride sheet or film. The type and the content of the plasticizer are not particularly limited provided that the sheet or film is so hard or elastic that images can be formed thereon.

The printing medium may have a surface energy of about 20.0 mN/m to 50.0 mN/m, about 25.0 mN/m to 45.0 mN/m, or about 30.0 mN/m to 40.0 mN/m. From the viewpoint of increasing the wettability of the dark-colored ink, a printing medium having a surface energy of about 30.0 mN/m to 45.0 mN/m or about 30.0 mN/m to 40.0 mN/m may be selected.

The surface energy (surface free energy) of the printing medium can be measured in accordance with JIS K6768: 1999. Alternatively, any of the surface tension test pens, dyne pens, or the like, which are available from, for example, Kabushikikaisha Machinetech (in Japanese), may be used. The surface energy thus obtained is represented in dyne/cm, and the conversion in terms of mN/m results in the same value. Also, the surface free energy of a solid is generally represented by mJ/m$^2$, and the conversion into surface tension (mN/m) results in the same value.

2. 3. Ink Application Steps

The ink jet printing method disclosed herein include a first ink application step of applying a dark-colored ink onto a printing medium, a second ink application step of applying a light-colored ink onto the printing medium, and a third ink application step of applying the dark-colored ink or the light-colored ink onto the dark-colored or light-colored ink irradiated with the UV light.

The first, the second, and the third ink application step may be performed by using the ink jet printing apparatus described above. In the third ink application step, the dark-colored or light-colored ink is applied onto the dark-colored or light-colored ink irradiated with UV light. In this step, by reducing the distance of transporting the printing medium in the sub-scanning direction in the above-described ink jet printing apparatus, the dark-colored or light-colored ink can be applied onto the cured coating by one pass operation. In this instance, the distance transported by one pass operation may be shorter than the length of the alignment of the nozzles in the sub-scanning direction. Thus, an ink is applied to the same region on the printing medium by two or more passes; hence, the dark-colored or light-colored ink is applied to the dark-colored or light-colored ink irradiated with UV light.

2. 4. UV Irradiation Steps

The ink jet printing method disclosed herein includes a UV irradiation step of irradiating at least one of the dark-colored ink and light-colored inks on the printing medium with UV light. In an embodiment, the ink jet printing method include a first UV irradiation step of irradiating the dark-colored ink on the printing medium with UV light, a second UV irradiation step of irradiating the light-colored ink on the printing medium with UV light, and a third UV irradiation step of irradiating at least one of the dark-colored and light-colored ink on the printing medium with UV light. These UV irradiation steps may be performed by using the above-described ink jet printing apparatus.

In the UV irradiation steps, the dark-colored ink and/or the light-colored ink is irradiated with UV light. The UV light used in the UV irradiation steps is emitted from a UV light-emitting diode (UV-LED).

In the UV irradiation steps, the UV light is emitted at 50.0 mJ/cm$^2$ or more every scanning of the printing apparatus. In some embodiment, the intensity of the UV irradiation in one scanning operation may be 55.0 mJ/cm$^2$ or more, 60.0 mJ/cm$^2$ or more, or 65.0 mJ/cm$^2$ or more.

2. 5. Optical Density in Printing Region

The ink jet printing method disclosed herein allows images to be formed on the printing medium according to printing conditions. The images to be formed in the method may include images having an optically dense portion, images having an optically thin portion, and images having both an optically dense portion and an optically thin portion without particular limitation. In other words, the ink jet printing method of the present disclosure enables the formation of images having a high color optical density and images having a low color optical density on the printing medium.

The term "printing conditions" used herein refers to the conditions set for printing an image with an ink jet printing apparatus. More specifically, the printing conditions include the volume of a droplet of individual inks, duty factor, printing resolution, the amount of ink applied onto a printing medium, the degree of superimposition of dots, and the type of printing medium.

The duty factor mentioned herein is a value defined by the following equation:

Duty factor (%)=number of dots actually ejected/(vertical resolution×horizontal resolution)×100

In the equation, the "number of dots actually ejected" refers to the number of dots actually ejected per unit area, and the "vertical resolution" and the "horizontal resolution" each refer to a resolution per unit length.

For optically dense portions, dots of the dark-colored ink are applied more than dots of the light-colored ink at a relatively high duty. For optically thin portions, dots of the light-colored ink are applied more than dots of the dark-colored ink at a relatively low duty factor.

Also, for a high-duty image portion, the frequency of further application of ink droplets onto previously applied ink droplets is increased. Such ink application may be, herein, expressed as "ink-on-ink". For a low-duty image portion, in contrast, the frequency of ink-on-ink is reduced, and the distance between applied ink droplets is increased.

In ink-on-ink application, after ink droplets previously applied are cured and, ink droplets are further applied onto the underlayer, that is, the cured product of ink droplets. In this instance, the surface energy of the underlayer is equal to the surface tension of the ink forming the underlayer.

The wettability of ink droplets on the underlayer depends on the surface tension of the ink and the surface energy of the underlayer. When the surface tension of the ink is lower than the surface energy of the underlayer, the wettability of the ink increases; and when the surface tension of the ink is higher than the surface energy of the underlayer, the wettability of the ink decreases. Wettability can be represented as contact angle and is, in general, described by Young's equation: $\gamma_S = \gamma_L \cos\theta \gamma_{LS}$, where $\gamma_S$ represents the surface tension (equivalent to the surface energy) of the underlayer, $\gamma_L$ represents the surface tension of the ink, and $\gamma_{LS}$ represents the interface tension between the underlayer and the ink.

In the ink jet printing method disclosed herein, portions having a high optical density and a high duty are formed by ink-on-ink application of a relatively large number of droplets of the dark-colored ink. Accordingly, the surface energy of the underlayer is increased by increasing the surface tension of the dark-colored ink. Thus, the wettability of the dark-colored ink to be subsequently applied is increased, thereby leveling the surfaces of high-duty portions to impart gloss. Consequently, a wide gamut of colors can be reproduced.

Also, in the ink jet printing method disclosed herein, portions having a low optical density and a low duty are formed by ink-on-ink application of a relatively large number of droplets of the light-colored ink. Accordingly, the wettability of the light-colored ink on the printing medium is improved by reducing the surface tension of the light-colored ink. Consequently, the granularity of low-duty portions in the image is kept from increasing.

3. Experimental Examples

The subject matter of the present disclosure will be further described in detail with reference to the following Experimental Examples. However, the subject matter of the present disclosure is not limited to the disclosed Examples. In the following description, "%" is on a mass basis unless otherwise specified.

3. 1. Preparation of Inks

The inks used in the Examples were prepared by mixing the constituents in the proportions (percent by mass) presented in Table 1 and stirring the mixture with a high-speed, water-cooled stirrer. For using the pigment (PR122, C.I. Pigment Red 122), a dispersion liquid was prepared in advance with 50% by mass of a dispersant Solsperse 36000 (a product of (LUBRIZOL)) relative to the pigment.

TABLE 1

|  | Dark-colored ink set 1 | | | | Dark-colored ink set 2 | | | |
| --- | --- | --- | --- | --- | --- | --- | --- | --- |
|  | Dark K1 | Dark C1 | Dark M1 | Dark Y1 | Dark K2 | Dark C2 | Dark M1 | Dark Y1 |
| PEA | 35.7 | 35.7 | 33.5 | 34.6 | 35.7 | 35.7 | 33.5 | 34.6 |
| VEEA | 20.0 | 20.0 | 20.0 | 20.0 | 20.0 | 20.0 | 20.0 | 20.0 |
| DPGDA | 15.0 | 15.0 | 15.0 | 15.0 | 15.0 | 15.0 | 15.0 | 15.0 |
| IBXA | 10.0 | 10.0 | 10.0 | 10.0 | 10.0 | 10.0 | 10.0 | 10.0 |
| n-VC | 7.5 | 7.5 | 7.5 | 7.5 | 7.5 | 7.5 | 7.5 | 7.5 |
| 819 | 5.0 | 5.0 | 5.0 | 5.0 | 5.0 | 5.0 | 5.0 | 5.0 |
| TPO | 4.0 | 4.0 | 4.0 | 4.0 | 4.0 | 4.0 | 4.0 | 4.0 |
| MEHQ | 0.1 | 0.1 | 0.1 | 0.1 | 0.1 | 0.1 | 0.1 | 0.1 |
| BYK-UV3500 | — | — | — | — | 0.5 | 0.5 | 0.5 | 0.5 |
| BYK-350 | 0.5 | 0.5 | 0.5 | 0.5 | — | — | — | — |
| Carbon black | 2.0 | — | — | — | 2.0 | — | — | — |
| PB15:3 | — | 2.0 | — | — | — | 2.0 | — | — |
| PR122 | — | — | 4.0 | — | — | — | 4.0 | — |
| PY155 | — | — | — | 3.0 | — | — | — | 3.0 |
| Dispersant | 0.2 | 0.2 | 0.4 | 0.3 | 0.2 | 0.2 | 0.4 | 0.3 |
| Surface tension | 32.0 | 32.0 | 32.0 | 32.0 | 22.0 | 22.0 | 22.0 | 22.0 |

TABLE 1-continued

|  | Dark K1 | Light-ink set 1 | | | Light-ink set 2 | | |
|---|---|---|---|---|---|---|---|
|  |  | Light K1 | Light C1 | Light M1 | Light K2 | Light C1 | Light M1 |
| PEA | 37.35 | 37.35 | 37.35 | 36.8 | 37.35 | 37.35 | 36.8 |
| VEEA | 20.0 | 20.0 | 20.0 | 20.0 | 20.0 | 20.0 | 20.0 |
| DPGDA | 15.0 | 15.0 | 15.0 | 15.0 | 15.0 | 15.0 | 15.0 |
| IBXA | 10.0 | 10.0 | 10.0 | 10.0 | 10.0 | 10.0 | 10.0 |
| n-VC | 7.5 | 7.5 | 7.5 | 7.5 | 7.5 | 7.5 | 7.5 |
| 819 | 5.0 | 5.0 | 5.0 | 5.0 | 5.0 | 5.0 | 5.0 |
| TPO | 4.0 | 4.0 | 4.0 | 4.0 | 4.0 | 4.0 | 4.0 |
| MEHQ | 0.1 | 0.1 | 0.1 | 0.1 | 0.1 | 0.1 | 0.1 |
| BYK-UV3500 | 0.5 | 0.5 | 0.5 | 0.5 | — | — | — |
| BYK-350 | — | — | — | — | 0.5 | 0.5 | 0.5 |
| Carbon black | 0.5 | 0.5 | — | — | 0.5 | — | — |
| PB15:3 | — | — | 0.5 | — | — | 0.5 | — |
| PR122 | — | — | — | 1.0 | — | — | 1.0 |
| PY155 | — | — | — | — | — | — | — |
| Dispersant | 0.05 | 0.05 | 0.05 | 0.1 | 0.05 | 0.05 | 0.1 |
| Surface tension | 22.0 | 22.0 | 22.0 | 22.0 | 32.0 | 32.0 | 32.0 |

The constituents presented in Table 1 are as follows:
PEA: Phenoxyethyl acrylate
VEEA: 2-(2-Vinyloxyethoxy)ethyl acrylate
DPGDA: Dipropylene glycol diacrylate
IBXA: Isobornyl acrylate
n-VC: n-vinylcaprolactam
819: IRGACURE 819 (product name) produced by BASF, polymerization initiator
TPO: IRGACURE TPO (product name) produced by BASF, 2,4,6-trimethylbenzoyldiphenylphosphine oxide
MEHQ: Hydroquinone monomethyl ether, polymerization inhibitor
BYK-UV3500: Product name of acryloyl group-containing polyether-modified polydimethylsiloxane produced by BYK Additives & Instruments, slipping agent
BYK-350: Product name of polyacrylate-based surfactant produced by BYK Additives & Instruments, slipping agent
Carbon Black: C.I. Pigment Black 7
PB15:3: C.I. Pigment Blue 15:3
PR122: C.I. Pigment Red 122
PY155: C.I. Pigment Yellow 155

The surface tensions of the inks were measured with an automatic surface tensiometer CBVP-Z (manufactured by Kyowa Interface Science), and the results are presented in Table 1.

3. 2. Ink Sets

Dark-colored ink set 1, dark-colored ink set 2, light-colored ink set 1, and light-colored ink set 2 were prepared by combining inks as presented in Table 1. Furthermore, ink sets individually including 7 color inks were prepared according to the combinations of Examples 1 to 4 presented in Table 2.

3. 3. Evaluation of Ink Sets

An ink jet printer PX-G920 (manufactured by Seiko Epson) was modified by providing a carriage with a UV irradiation device capable of irradiation at an intensity of 50.0 mJ/cm$^2$, and test patterns were formed by ejecting the inks of each ink set presented in Table 2 onto a PET film at room temperature and normal pressure from the modified printer while being irradiated with UV light having a wavelength of 365 nm during every pass.

Each of the resulting test patterns was evaluated in terms of the following properties according to the respective criteria. The results were presented in Table 2.

Color Reproduction Gamut

The cured coating formed by printing was subjected to colorimetry with a spectrophotometer (manufactured by X-rite), and the density was estimated by plotting reproduced colors in the L*a*b*color space. The resulting color reproduction gamut was compared with PANTONE color gamut.

A: The resulting gamut covered 50% or more of the Pantone gamut.
B: The resulting gamut covered less than 50% of the Pantone gamut.

Filling Property (Visual Test)

A cured coating having a gradation pattern with duties from 0% to 100% in increments of 10% was formed and visually examined in terms of the following:

A: The printed solid pattern was evenly filled.
B: The printed solid pattern had nonuniform streaks.

Granularity (Visual Test)

The same cured coating having a gradation pattern as used in the filling property test was formed and visually examined in terms of the following:

TABLE 2

| Ink set | Example 1 Dark ink set 1 Light ink set 1 | Example 2 Dark ink set 1 Light ink set 2 | Example 3 Dark-ink set 2 Light ink set 1 | Example 4 Dark ink set 2 Light ink set 2 |
|---|---|---|---|---|
| Color reproduction range | A | A | B | B |
| Filling property | A | B | A | B |
| Granularity | A | B | A | B |

A: Dots in the low-duty portions (with a duty factor of 10% to 20%) were not visually recognized.

B: Dots in the low-duty portions (with a duty factor of 10% to 20%) were visually recognized.

Table 2 shows that Examples 1, in which the dark-colored inks had higher surface tensions than the light-colored inks, exhibited satisfactory results in terms of all the color reproduction gamut, the filling property, and the granularity. In contrast, in the Examples 2 to 4, in which the surface tensions of the dark-colored inks were lower than or equal to those of the light-colored inks, the results were not sufficient in either one or both the color reproduction gamut and the filling property.

The implementation of the subject matter disclosed herein is not limited to the above-described embodiments, and various modifications may be made. For example, the subject matter disclosed herein may be implemented in substantially the same manner as any of the disclosed embodiments (for example, in terms of function, method, and results, or in terms of purpose and effect). Some elements used in the disclosed embodiments but not essential may be replaced. Implementations capable of producing the same effect as produced in the disclosed embodiments or achieving the same object as in the disclosed embodiments are also within the scope of the subject matter of the present disclosure. A combination of any of the disclosed embodiments with a known art is also within the scope of the subject matter of the present disclosure.

What is claimed is:

1. A radiation-curable ink jet ink set, comprising:
    a radiation-curable dark-colored ink having a surface tension $\gamma 1$; and
    a radiation-curable light-colored ink having a surface tension $\gamma 2$,
    wherein the surface tensions of the radiation-curable inks satisfy $\gamma 1 > \gamma 2$, and
    each of the dark-colored ink and the light-colored ink includes a polymerizable compound.

2. The radiation-curable ink jet ink set according to claim 1, wherein
    the surface tensions of the radiation-curable inks satisfy $\gamma 1 - \gamma 2 \geq 5.0$ mN/m.

3. The radiation-curable ink jet ink set according to claim 1, wherein
    at least one of the dark-colored ink and the light-colored ink
contains:
    a compound represented by the following general formula (I):

$$H_2C = CR^1 - \underset{\underset{O}{\|}}{C} - O - R^2 - O - CH = CHR^3 \quad (I)$$

wherein $R^1$ represents a hydrogen atom or a methyl group, $R^2$ represents a divalent organic residue having a carbon number of 2 to 20, and $R^3$ represents a hydrogen atom or a monovalent organic residue having a carbon number of 1 to 11; and
an acylphosphine oxide-based compound.

* * * * *